Figure 2:
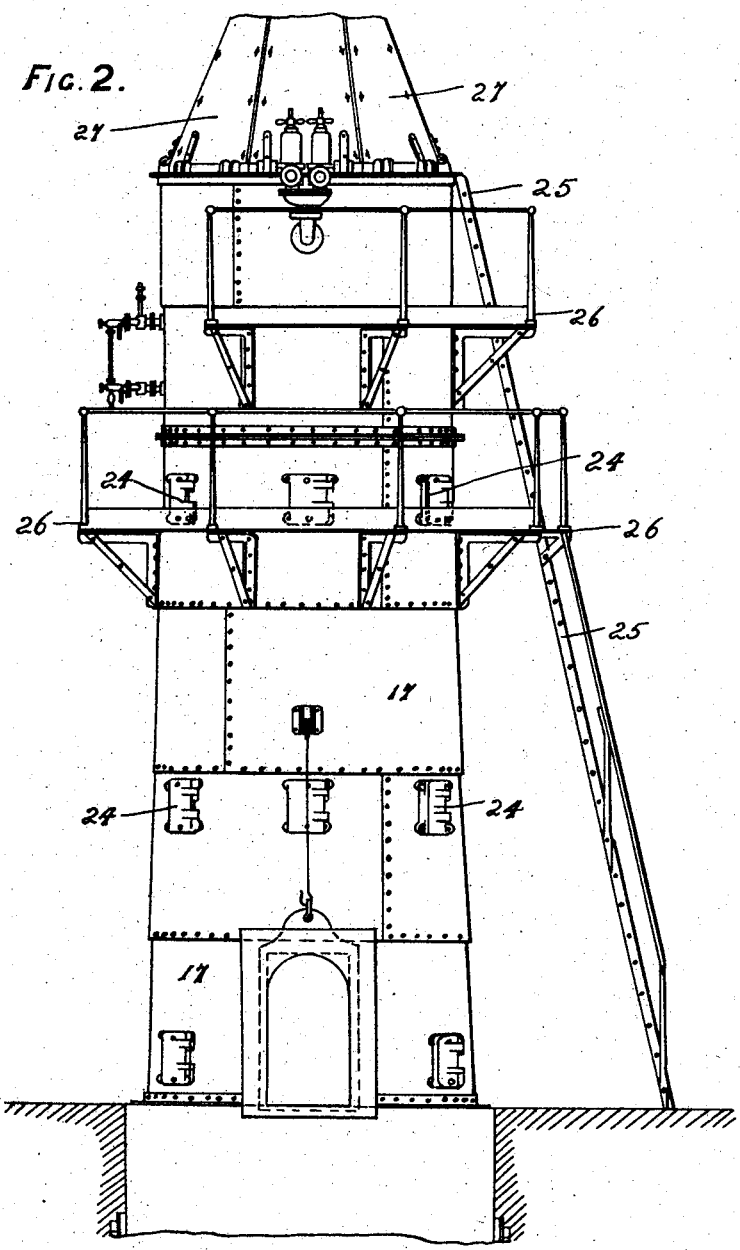

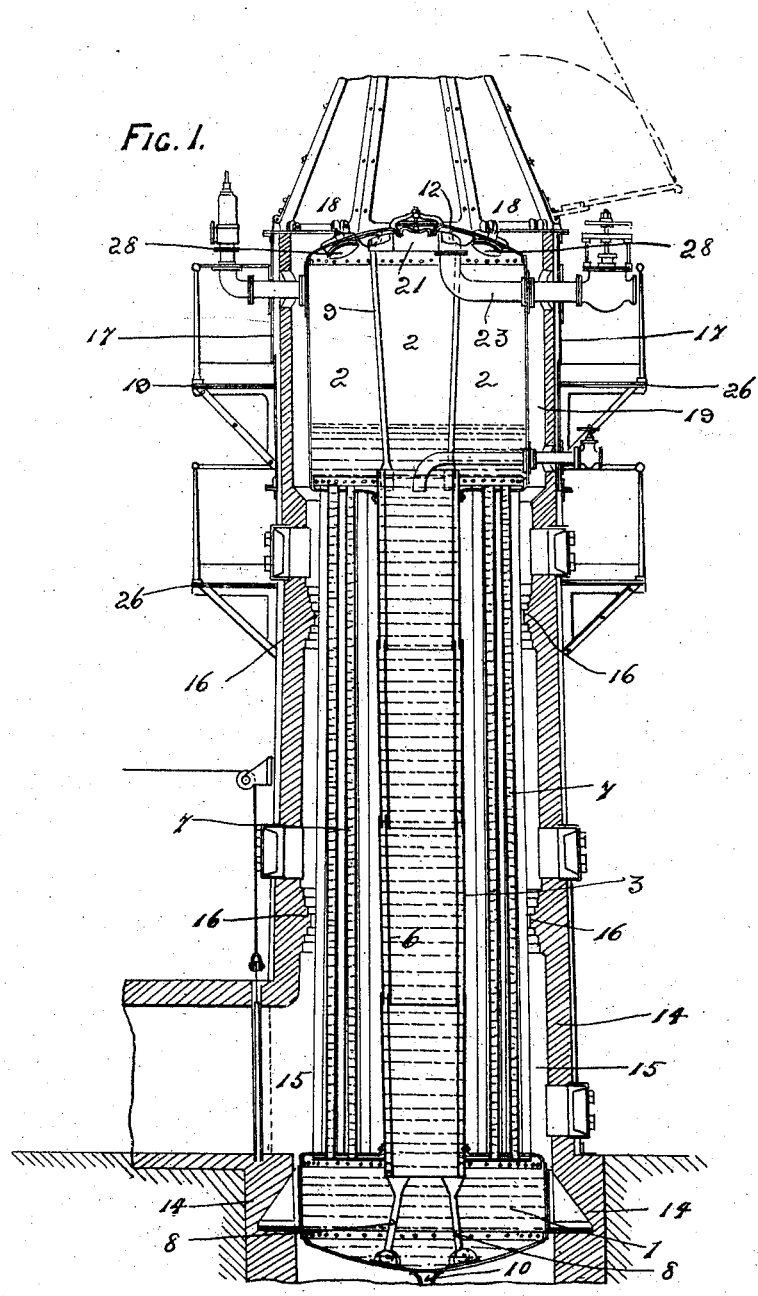

No. 772,789. PATENTED OCT. 18, 1904.
A. B. C. & J. A. DANKS.
STEAM BOILER.
APPLICATION FILED JAN. 21, 1904.
NO MODEL. 9 SHEETS—SHEET 2.
Fig. 1.A
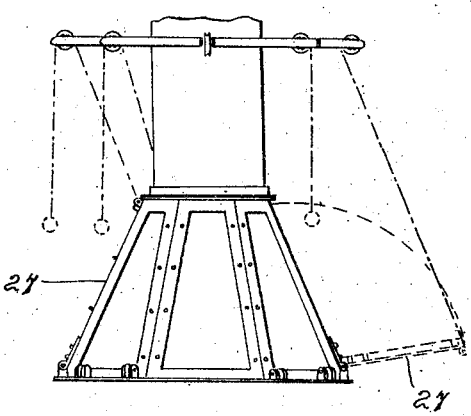
Fig. 1 B
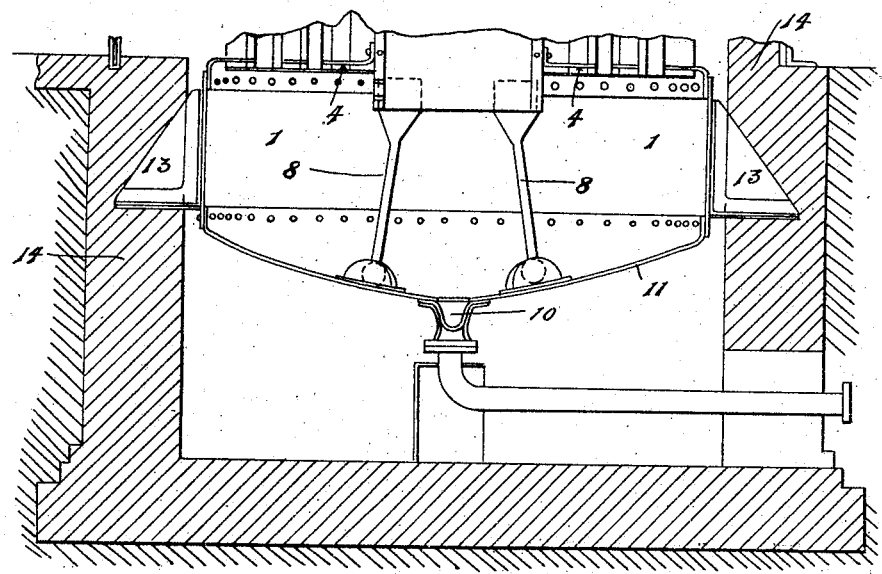
Witnesses.
Inventors.

No. 772,789. PATENTED OCT. 18, 1904.
A. B. C. & J. A. DANKS.
STEAM BOILER.
APPLICATION FILED JAN. 21, 1904.
NO MODEL. 6 SHEETS—SHEET 6.
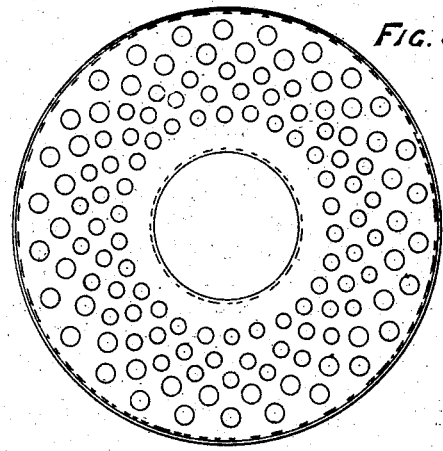
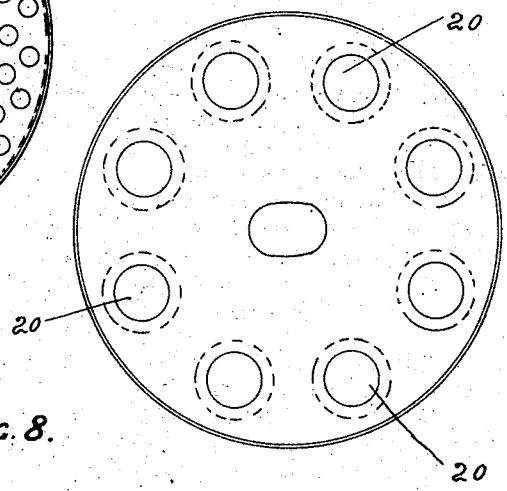
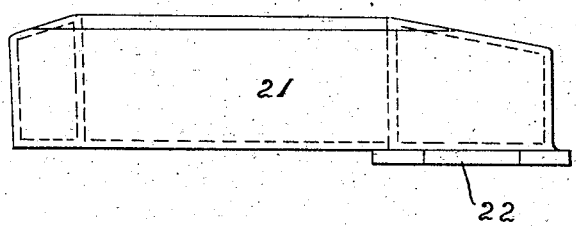
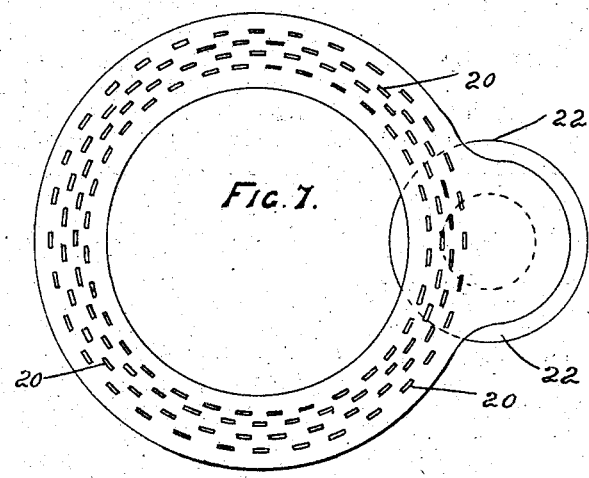
Witnesses. Inventors.

No. 772,789. Patented October 18, 1904.

UNITED STATES PATENT OFFICE.

ALFRED BENJAMIN CHARLES DANKS AND JAMES ARTHUR DANKS, OF NETHERTON, NEAR DUDLEY, ENGLAND.

STEAM-BOILER.

SPECIFICATION forming part of Letters Patent No. 772,789, dated October 18, 1904.

Application filed January 21, 1904. Serial No. 190,094. (No model.)

*To all whom it may concern:*

Be it known that we, ALFRED BENJAMIN CHARLES DANKS and JAMES ARTHUR DANKS, directors, subjects of the King of Great Britain, and residents of Crown Boiler Works, Netherton, near Dudley, in the county of Stafford, England, have invented a certain new and useful Improvement in Steam-Boilers, (for which we have applied for a patent in Great Britain, Patent No. 19,307, dated September 8, 1903,) of which the following is a specification.

This invention relates to improvements in steam-boilers, and refers particularly to the class known as "vertical water-tube boilers," the object of these improvements being to improve the circulation and equalize the temperature and consequent expansion of the whole heating-surface, at the same time facilitating the drawing of the tubes for cleaning and repair, and the provision of a means for the prevention of priming.

In order that this invention may be clearly understood and more easily carried into practice, we have appended hereunto six sheets of drawings upon which we have illustrated the nature of our said invention.

Figure 3:
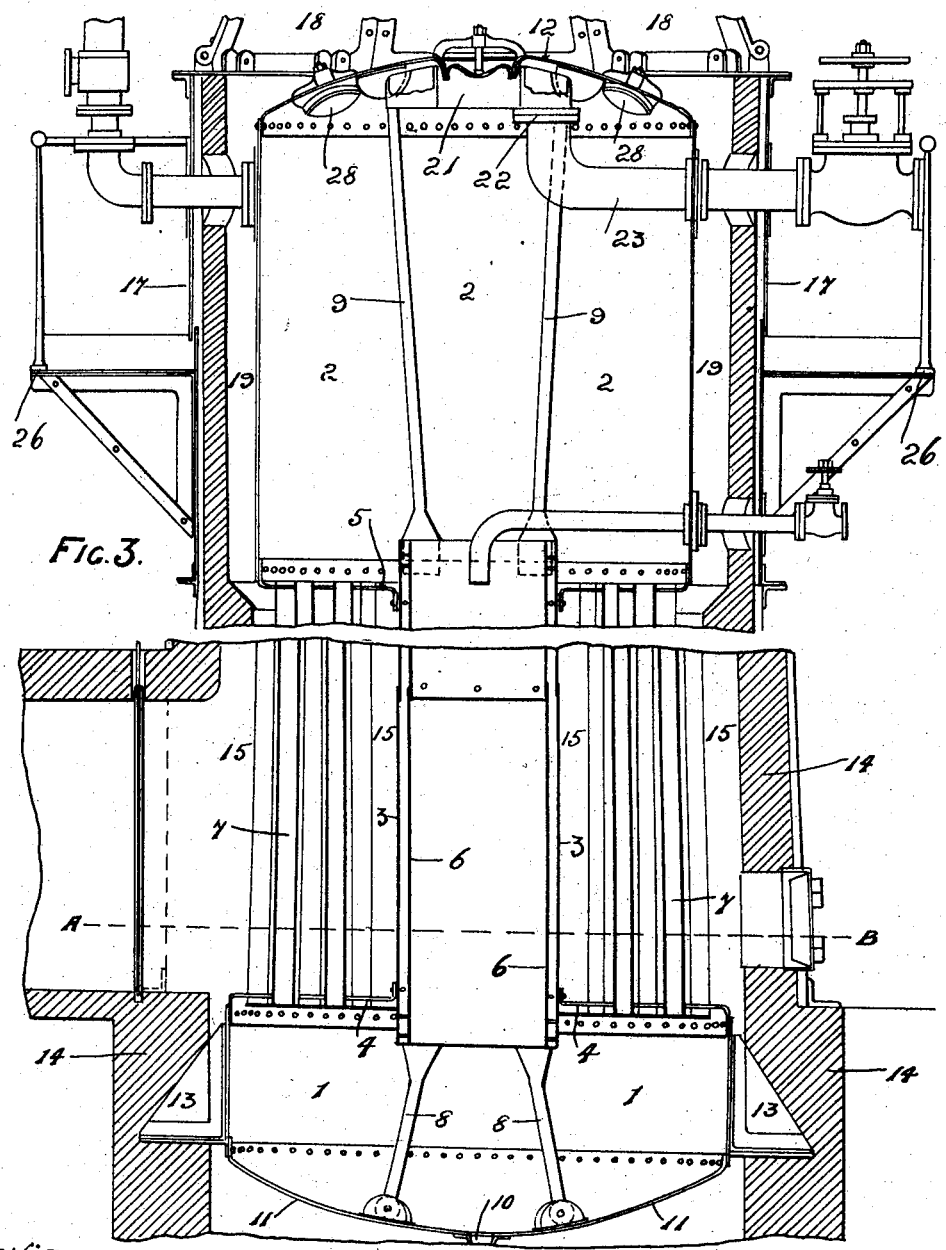
Figure 4:
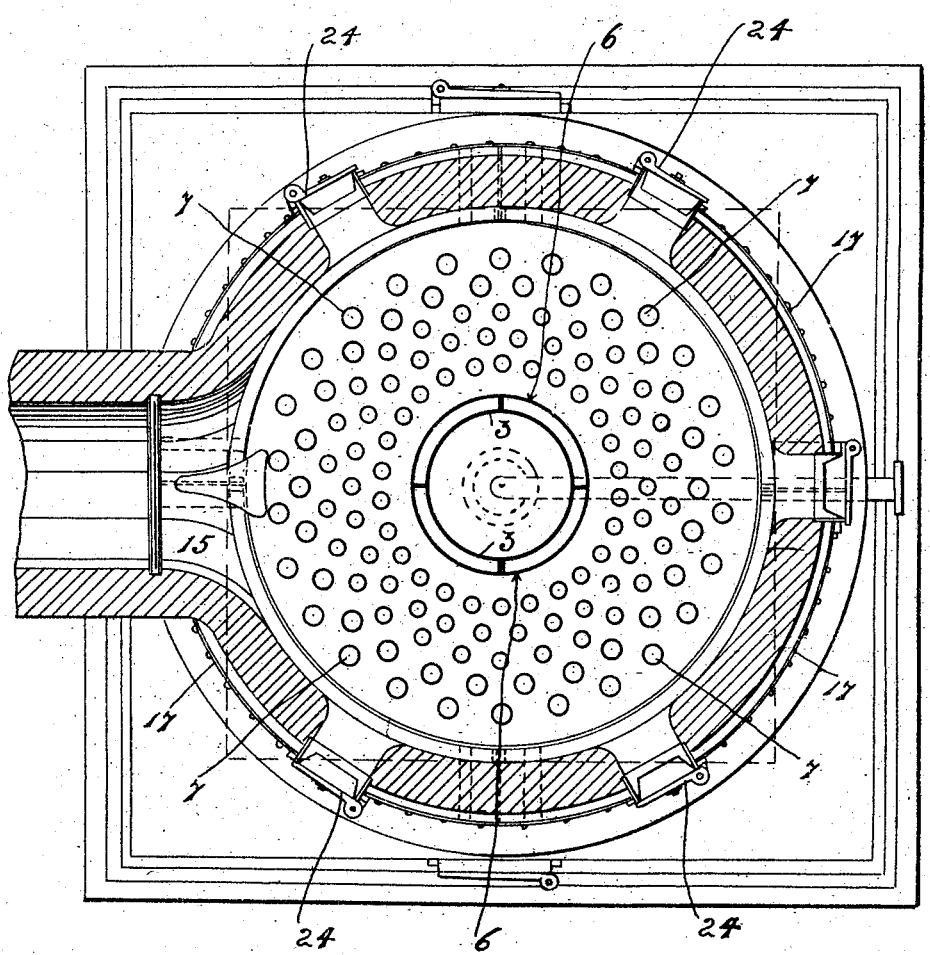

Figure 1 is a vertical section through the boiler and casing. Fig. 1$^A$ is a continuation of the upper part of Fig. 1, showing a further portion of the hood. Fig. 1$^B$ is a continuation of the lower part of Fig. 1 and shows a further portion of the blow-off pipe. Fig. 2 is an exterior elevation of the boiler shown in Fig. 1. Fig. 3 is an enlarged vertical section of the top and bottom chambers illustrated in Fig. 1. Fig. 4 is a plan on the line A B, Fig. 3. Fig. 5 is a plan of the top tube-plate. Fig. 6 is a plan of the top plate of the boiler. Fig. 7 is an inverted plan of the antipriming-pipe or steam-drier. Fig. 8 is an elevation of the antipriming-pipe shown in Fig. 7.

In carrying this invention into effect the boiler consists of two drums 1 and 2, arranged one above the other and connected by a large central riveted tube 3, which is securely riveted to the drums 1 and 2, the tube-plates 4 and 5 of which are flanged to receive it. The central tube thus forms a reliable support for the upper or steam drum 2, while the tube 6, which is of a lesser diameter, is placed inside and concentric with the central tube 3 to prevent the water in contact with the latter and which would of course have a tendency to ascend from restricting the downward passage of the return water. This inner tube 6 is formed of plates of suitable thickness and is bolted together to admit of its removal. Arranged round the large central tube 3 and equally spaced are a large number of tubes 7 of varying sizes and which are slightly bulged at their upper ends to facilitate removal. These tubes are vertical and are carefully expanded into holes bored to receive them, thus forming a thoroughly-reliable joint.

The respective bottom and crown 11 and 12 of the steam and mud drums are securely stayed to the central tube by the bar-stays 8 and 9, while the blow-off pipe is connected at 10 to the bottom of the mud-drum 1, the convex shape of the bottom 11 of the drum greatly assisting the gravitation of the mud to the blow-off pipe at 10.

The boiler is supported on its foundation by the brackets 13, which are riveted to the lower drum 1 of the boiler, which thus stands entirely independent of the brickwork surrounding it, thus enabling the boiler to expand without straining itself against the brickwork 14, while suitable expansion-boxes are provided in the brickwork where the pipes pass through to allow of the required freedom for expansion.

On reference to the drawings it will be seen that upon entering the chamber 15, within which the boiler is inclosed, at the level of the lower tube-plate 4 the gases surround the lower end of the water-tubes 7, so that the water therein, as also that between the central tubes 3 and 6, becomes heated, and as the gases ascend they are deflected in and out among the tubes by the judicious placing of the brickwork offsets 16 until they impinge against the top tube-plate 5, and when on their way to the chimney 18, which surmounts the casing 17, the gases traverse the outside of the steam-drum 2 at 19, thereby to some degree superheating the steam. Upon reaching the steam-drum 2 the particles of steam which have been formed are given off into the steam-space and the remaining water is ready for its return to the bottom by way of the inner tube 6, which tube, it should be noted, is entirely shielded from contact with the heated gases by the outer tube 3, and as there is not steam in the water of this central tube and no possibility of any being generated until it comes again in contact with that portion of the boiler on which the heated gases are playing it is naturally heavier or of greater density than that in the heated water-tubes, and consequently it descends with greater rapidity, the circulation being so rapid that scale cannot form in the vertical tubes, any deposits necessarily taking place where there is comparatively a slight period of rest, which occurs where there is a volume of water not subjected to the direct action of the gases and which in this case occurs in the mud-drum 1, from whence the deposits can be readily discharged by the blow-off valve.

It will be seen from the description of the working of this boiler that a perfect circulation is obtained and that no conflicting currents of water can be set up, while the whole of the working parts of the boiler being subjected to the heated gases no straining of parts can occur, as is the case with boilers where a considerable portion of their surface is outside their setting and is actually exposed to cold air.

For the purpose of preventing priming the point from which steam is taken is arranged considerably above the water-line, at which point a series of perforated plates are placed to break up and liberate the particles of steam from the streams of water emitted from the water-tubes, the steam afterward passing through the perforations 20 in the annular drier-chamber 21, which is connected at 22 with the steam-supply pipe 23.

The boiler-casing is formed of plates 17, with a lining 14 of brickwork, and is provided with a sufficient number of air-tight hinged doors 24 for the inspection and cleaning of the fire side of the tubes. A ladder 25 and gangways 26 are also provided to enable the attendant to reach every fitting on the boiler with great ease, thus providing special facilities for examination and cleaning. The eight doors 27, which form the hood of the casing, are secured by cotters, which only require to be removed to enable these doors to be swung open by means of pulleys and chains provided, upon which the whole of the top of the boiler is exposed to view, the doors 27 at the same time forming a safe and convenient platform for men to work upon, while at the same time upon the removal of two man-lids, one in each of the drums 1 and 2, every tube can be examined and cleaned, whereas in this class of boilers it has been usually necessary to remove two covers to each tube for the purpose.

Any of the tubes 7 when worn out can be loosened from the tube-plates in the usual way and be pushed up through the tube-holes and through the most convenient of the doors 28, provided in the crown-plate 12 of the boiler for this purpose, and the tube then replaced.

Having now described our invention, what we claim as new, and desire to secure by Letters Patent, is—

In a steam-boiler the combination of two drums placed one above the other, two centrally-located concentric tubes connecting the two drums, a series of small tubes arranged around the central tubes having their lower ends secured to the top tube-plate of the lower drum and their upper ends secured to the bottom tube-plate of the upper drum, a casing inclosing the drums and forming therewith an internal chamber, offsets in the internal chamber to deflect the passage of the gases as they circulate around the tubes, and an annular perforated drier within the crown of the upper drum.

In witness whereof we have hereunto set our hands in the presence of two witnesses.

ALFRED BENJAMIN CHARLES DANKS.
JAMES ARTHUR DANKS.

Witnesses:
   LEWIS WM. GOOLD,
   WALTER H. E. BARTLAME.